May 4, 1965     H. W. DIETERT     3,181,370
MOLDABILITY RECORDER
Filed July 9, 1962     2 Sheets-Sheet 1
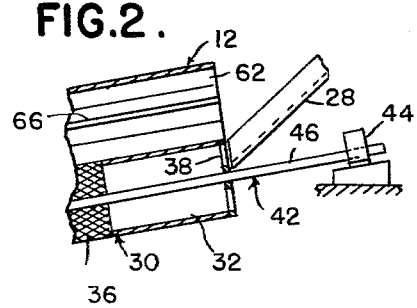
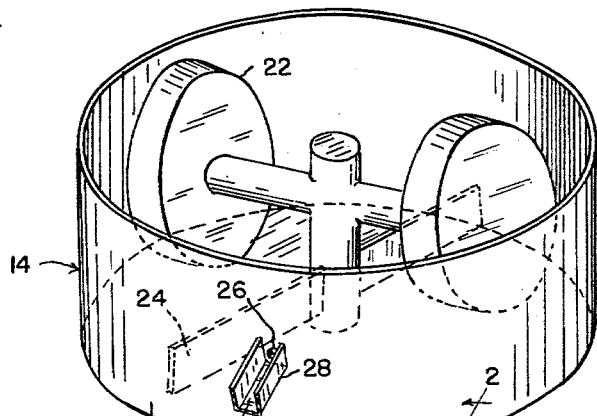
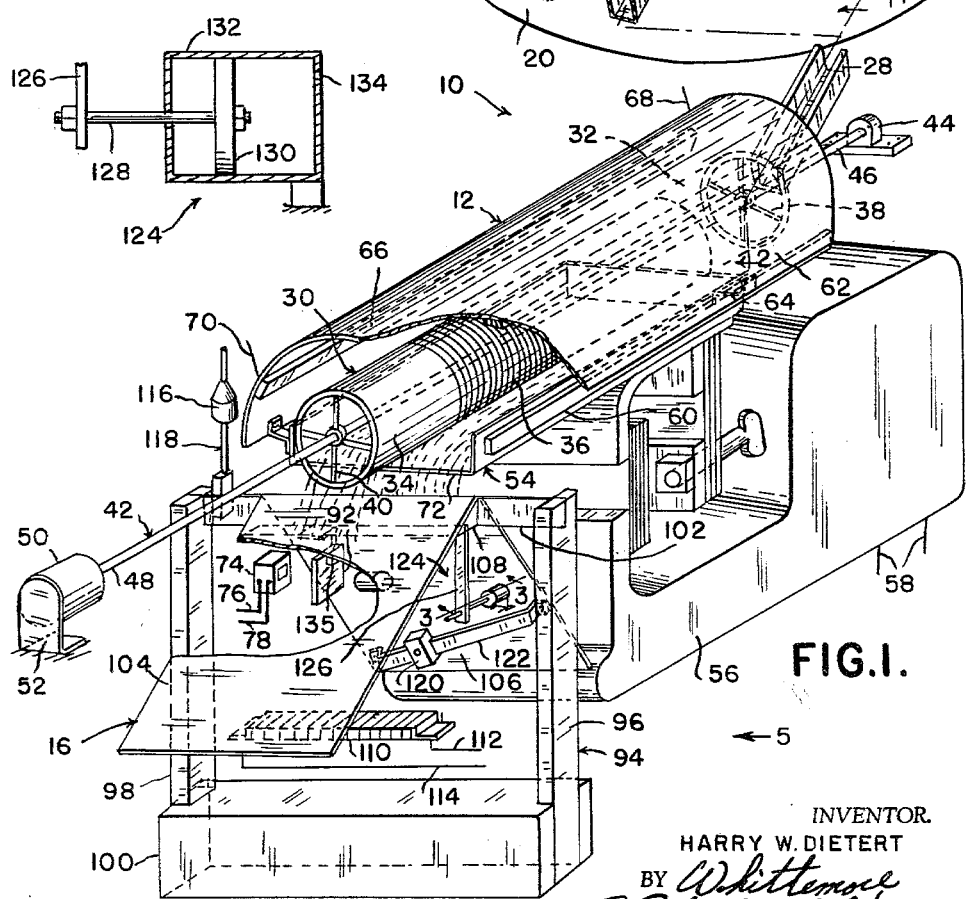
INVENTOR.
HARRY W. DIETERT
ATTORNEYS

INVENTOR.
HARRY W. DIETERT
BY
ATTORNEYS

United States Patent Office 3,181,370
Patented May 4, 1965

3,181,370
MOLDABILITY RECORDER
Harry W. Dietert, Kerrville, Tex., assignor to Harry W. Dietert Co., Detroit, Mich., a corporation of Michigan
Filed July 9, 1962, Ser. No. 208,526
7 Claims. (Cl. 73—432)

The invention relates to granular material conditioning apparatus and refers more specifically to mechanism for continuously determining and recording the moldability index of foundry sand or similar granular material.

The moldability index of foundry sand is defined by the following formula wherein B is the weight of a sample of granular material passing through a screen over which the granular material is passed and A is the weight of the sample of granular material retained on the screen over which the granular material is passed with the added obvious requirement that the openings in the screen cannot be so large as to permit the entire sample to immediately fall through the screen nor so small that separation of the granular material is in accordance with grain size rather than moldability. The moldability index is more completely set forth in commonly owned copending application, Serial No. 83,074, filed January 16, 1961, now Patent No. 3,136,009.

$$\text{Moldability} = \frac{B}{A+B} \cdot 100$$

In the past the moldability index of foundry sand and similar granular material has been intermittently determined by laboratory apparatus and methods such as disclosed in co-pending commonly owned patent application, Serial No. 132,902, filed August 21, 1961, now Patent No. 3,151,368. The intermittent measurement of the moldability index of granular material is undesirable in that between tests the moldability of the granular material may change appreciably and further no permanent record of the complete moldability history of the granular material is obtained or recorded.

It is therefore one of the objects of the present invention to provide apparatus for continuously determining and recording the moldability index of granular material such as foundry sand.

Another object is to provide apparatus for continuously determining and recording the moldability index of granular material comprising means for continuously separating a continuous sample of the granular material in accordance with the moldability thereof, means for developing a continuous electric signal variable in accordance with the division of the sample of granular material and means for producing a permanent record of the variation in the electrical signal.

Another object is to provide continuous moldability determining and recording apparatus as set forth above wherein the means for separating the sample of granular material comprises a rotating cylindrical screen into which the granular material is fed which is inclined to produce movement of the sample of granular material longitudinally thereof on rotation thereof, and a vibrating trough positioned beneath the screen to receive the granular material passing through the screen as the granular material is fed longitudinally of the screen.

Another object is to provide continuous moldability determining and recording apparatus as set forth above wherein the means for developing an electrical signal proportional to the division of granular material comprises a torsion band balance positioned to receive the granular material from the screen on one side thereof and from the trough on the other side, a light shield secured to the balance and movable therewith, a light source in the form of a slot and a light responsive source of electric energy for producing an electric signal variable in accordance with the light falling thereon positioned on opposite sides of the light shield whereby the light responsive electric source receives light through said slot depending on the position of the balance and light shield.

Another object is to provide apparatus as set forth above including means in conjunction with the balance to dampen the movement thereof.

Another object is to provide apparatus as set forth above wherein the balance includes means for adjusting the balanced position thereof.

Another object is to provide continuous moldability index determining and recording apparatus as set forth above wherein the means for providing a permanent record of the variations in the electric signal comprises, a balanced circuit, a voltage divider connected to the light responsive source of electrical energy for tapping off a portion of the variable electric signal as a controlling voltage for the balanced circuit, an electric motor in the balanced circuit rotatable in accordance with the direction of electrical energy fed thereto, a balancing slide wire controlled by the motor, a visual indicator similarly controlled by said motor and a recording unit comprising an ink pen assembly positionable in accordance with the rotation of said motor and a chart operably associated with the ink pen and driven at a predetermined speed whereby a permanent record of the moldability history of the sample of granular material is provided.

Another object is to provide continuous moldability index determining and recording apparatus which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a perspective view of material separating and signal developing portions of continuous moldability index determining and recording apparatus constructed in accordance with the invention.

FIGURE 2 is a partial section view taken substantially on the line 2—2 in FIGURE 1 particularly illustrating the inclined position of the rotatable screen and the relation thereto of the chute from the granular material mixer of the apparatus illustrated in FIGURE 1.

FIGURE 3 is an enlarged section view of the balance dampening mechanism of the apparatus illustrated in FIGURE 1 taken substantially on the line 3—3 in FIGURE 1.

Figure 4:
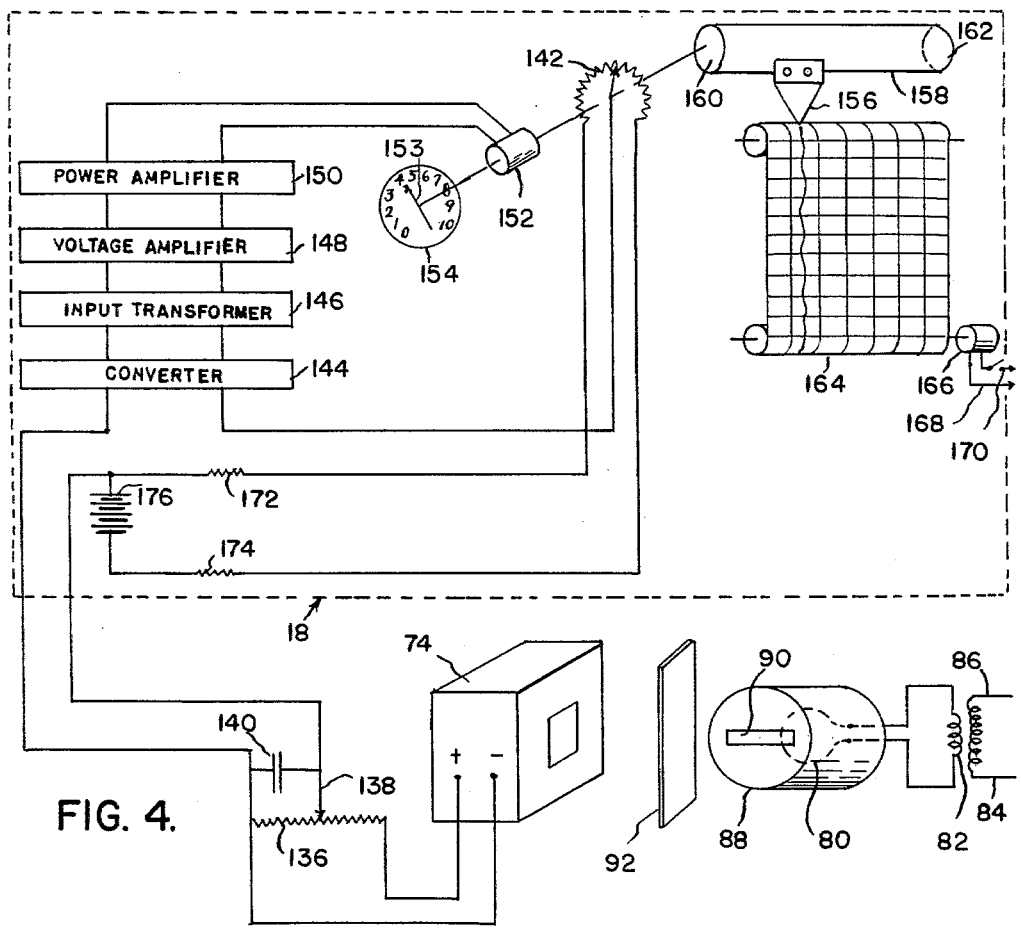
FIGURE 4 is a partially diagrammatic, partially schematic representation of signal developing and signal recording portions of moldability index determining and recording apparatus constructed in accordance with the invention.
Figure 5:
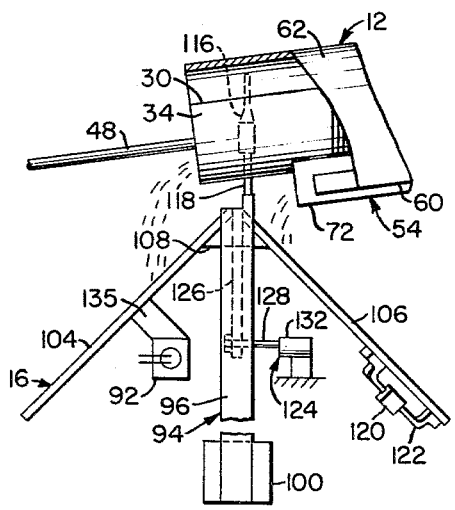
FIGURE 5 is an elevation view of the balance portion of the continuous moldability index determining and recording apparatus illustrated in FIGURE 1 taken in the direction of arrow 5 in FIGURE 1.

With reference to the figures of the drawings one embodiment of the invention will now be considered in detail.

The continuous granular material moldability determining and recording apparatus 10, illustrated in FIGURES 1–4, includes mechanism 12 for separating a continuous sample of granular material received thereby from the mill 14 in accordance with the moldability of the granular material. The structure 16 for developing a continuous electric signal variable in accordance with the division of the continuous sample of ganular material and apparatus 18 for indicating and continuously recording the moldability index of the sample of granular material completes the continuous moldability determining and recording apparatus 10.

More specifically the mill 14 includes the usual cylindrical container 20 having the rollers 22 and scrapers 24 rotatably mounted therein. The container 20, as shown, is provided with an opening 26 in the side wall thereof in alignment with a sample feeding chute 28. Thus on rotation of the rollers 22 and scrapers 24 in the container 20 by convenient means (not shown), a substantially continuous sample of granular material being mixed in the mill 14 is forced out of the container 20 through the opening 26 therein into the chute 28 and is delivered to the granular material separating mechanism 12.

The separating mechanism 12, as best shown in FIGURES 1 and 2, includes an inner cylindrical member 30 having hollow imperforate cylindrical end sections 32 and 34 separated by a cylindrical screen center section 36. Shaft 42 extends axially completely through the cylindrical member 30. Spiders 40 are secured to opposite ends of the cylindrical end sections 32 and 34 and are fixed to the shaft 42. Shaft 42 is mounted for rotation in a bearing 44 at end 46 thereof and is supported for rotation at the end 48 by the motor 50 which is mounted on bracket 52.

The cylindrical member 30 is inclined to the horizontal, as shown exaggerated in FIGURE 2, to provide a feed for granular material passed into the solid end section 32 thereof toward the solid end section 34 on rotation of the cylindrical member.

As shown best in FIGURE 2, the chute 28 terminates adjacent the upper portion of the end section 32 of the rotatable cylindrical member 30. Therefore, granular material discharged from the mill 14 into chute 28 flows into the section 32 of the cylindrical member 30 through the spider 38 due to momentum thereof in chute 28 and the action of gravity.

The granular material separating mechanism 12 further includes the trough 54 positioned immediately beneath the cylindrical member 30, as shown best in FIGURE 1, to receive the portion of the sample of granular material fed to the cylindrical member 30 which passes through the screen section 36 thereof during traverse of the granular material lengthwise of the cylindrical member 30.

Trough 54 is mounted for vibration on the commercially obtainable vibrator 56 which may be energized by a suitable electric source (not shown) over electrical conductors 58. Further the trough 54 is provided with electrical strip heating elements 60 to prevent sticking of granular material thereto.

A heat shield 62 is provided which extends for substantially one hundred eighty degrees around the top of the cylindrical member 30 and is connected to the trough 54 for movement therewith by brackets 64. Strip heaters 66 are spaced angularly around the shield 62 as shown and may be energized by a source of electric energy (not shown) connected thereto over conductors 68 and 70.

The structure 16 for developing a continuous electric signal variable in accordance with the division of the continuous sample of granular material includes the light responsive source of electric energy 74 operable to generate a variable electric signal across the conductors 76 and 78 in accordance with the amount of light impinging thereon such as a Sola battery. A light source 80 which may be energized by convenient means such as transformer 82 from a source of electric energy (not shown) over conductors 84 and 86 and is positioned adjacent the light responsive source of electric energy 74, cylindrical light shield 88 positioned over light source 80 and having a slot 90 therein and light shield 92 positioned between the slot 90 and the source of electric energy 74 and secured to the balance 94 for movement therewith together with balance 94 complete the structure 16 for developing a continuous electric signal variable in accordance with the division of the continuous sample of granular material.

Balance 94 includes the vertical members 96 and 98 secured to a base 100 between which a torsion band 102 of resilient material is rigidly secured and the balance planes 104 and 106 secured to the torsion band 102 by triangular members 108. The torsion band 102 may be of resilient material such as steel while the balance planes 104 and 106 are Teflon sheets. In addition a strip heater 110 is positioned beneath the balance planes and may be connected to a convenient electrical source (not shown) by means of conductors 112 and 114 whereby sand is prevented from sticking on the balance planes.

An adjustable weight 116 is secured to the torsion band 102 at one side thereof to permit adjusting of the center of gravity of the balance 94 through the geometrical center line of the torsion band 102. The weight 116 is adjustable axially of the rod 118 by convenient means (not shown). An additional balancing weight 120 is provided in conjunction with the balance plane 106 and is adjustable along a diagonally extending supporting band 122 therefor secured to the balance plane 106 by convenient means.

Further the balance 94 is provided with mechanism 124 for dampening the balancing movement thereof to prevent undue oscillation of the balance planes 104 and 106. The means 124 includes a rigid member 126 secured to the triangular members 108 of the balance 94 at one end and to a piston rod 128, as shown best in FIGURE 3, at the other end. Piston rod 128 is in turn secured to piston 130 within cylinder 132. Movement of the piston 130 within the cylinder 132 is controlled by an air bleed orifice 134 in cylinder 132 whereby rapid oscillation of the balancing planes 104 and 106 are dampened. If desired the orifice 134 may be a controlled orifice for adjusting the degree of dampening of the balance 94.

Light shield 92 is supported on balance 94 for movement therewith by bracket 135. The source of light 80 and the light responsive source of electric energy 74 are secured on opposite sides of light shield 92 in a fixed position relative to the light shield and each other.

The apparatus 18 for providing a visual indication of the moldability index and for providing a permanent record thereof is shown best in FIGURE 4 and comprises a voltage divider circuit 136 for selecting a desired signal level from the light responsive source of variable electrical energy 74 including the movable wiper arm 138 and condenser 140.

The variable signal from the voltage divider circuit 136 is fed through a balancing slide wire 142 to a converter 144, input transformer 146, voltage amplifier 148 and power amplifier 150 in series. The slide wire 142 in conjunction with voltage divider 136, resistors 172 and 174, energy source 176, converter, input transformer, voltage amplifier and power amplifier feed current to the motor 152 from a balanced circuit so that the motor 152 will move the wiper arm of slide wire 142 in opposite directions from a center position depending on the direction of variation in the electric signal generated by the source of electrical energy 74. The operation of the balanced motor 152 will position the visual indicator 154 to indicate instantaneous moldability index of granular material in mill 14. Operation of motor 152 will also move the pin 156 on line 158 extending around pulleys 160 and 162 in the known manner. The chart 164 driven by motor 166 which motor is energized from a source of electricity over conductors 168 and 170 (not shown) is provided in conjunction with the pin 156, as shown best in FIGURE 4, whereby a permanent record of the moldability index of the granular material in the mill 14 is provided.

In over-all operation of the continuous granular material moldability determining and recording apparatus 10 the wheels 22 and scraper 24 of the mill 14 are rotated within the container 20 to force a substantially continuous sample of granular material from opening 26 into the chute 28. The continuous sample of granular material is delivered into the end section 32 of the cylindrical member 30 due to the momentum thereof and gravitational forces. The continuous sample of granular material is then traversed longitudinally through the cylindrical member 30 due to the inclination of the cylindrical member 30 and rotation thereof by means of the motor 50 connected to the shaft 42 on which the cylindrical member 30 is mounted.

During the longitudinal movement of the continuous sample of granular material through the cylindrical member 30 a portion of the sample of granular material depending on the moldability index of the sample of granular material will fall through the screen or center section 36 of the cylindrical member 30 into the trough 54. The granular material falling into the trough 54 will be advanced toward the end 72 thereof due to vibration of the trough 54 by vibrator 56.

Thus the continuous sample of granular material entering the cylindrical member 30 will be divided into two portions depending on the moldability thereof, one portion of which will be discharged through the end section 34 of the cylindrical member 30 onto the balance plane 104 and the other portion of which will be discharged from the end 72 of the trough 54 onto the balance plane 106.

The balance 94 will be caused to move in accordance with the relative weights of granular material falling on the planes 104 and 106 thereof to cause movement of the light shield 92 secured thereto for movement therewith. Movement of the light shield and balance planes 104 and 106 may be adjusted by means of the weights 116 and 120 which determine the balanced position of the balance planes 104 and 106. Dampening of the movement of the balance planes 104 and 106 is provided by the mechanism 124.

Movement of the light shield 92 provides a variation in the light from the light source 80 passing through the slot 90 received by the light sensitive source of electric energy 74. Thus it will be seen that the electric signal produced by the light sensitive source of electric energy 74 will vary in accordance with the position of the balance and therefore the moldability index of the granular material discharged from the trough 72 and cylindrical member 30.

The variable electric signal produced by the light sensitive source of electric energy 74 is caused to operate the motor 152 connected to the light sensitive source of electric energy 74 through a balanced slide wire circuit. Operation of the motor 152 as has been previously indicated may be in either direction depending on the direction of variation of the electric signal from the light sensitive source of electrical energy.

The motor 152 drives the slide wire 142 toward a balanced position wherein no driving electric energy is applied across the motor. Motor 152 also rotates the pointer 153 of indicating means 154 to provide a continuous visual display of the moldability index of the sample of granular material and rotates the pulley 160 to which the linear member 158 carrying the pin 156 is secured to move the pin 156 in accordance with variations in the moldability index of the sample of granular material. The pin 156 in conjunction with the chart 164 driven by motor 166 provides a permanent record of the moldability index history of the continuous sample of granular material.

Thus one embodiment of the present invention has been disclosed in detail. Other embodiments and modifications of the invention are contemplated. It is the intention to include all such embodiments and modifications within the scope of the invention as defined by the appended claims.

What I claim as my invention is:

1. Mechanism for continuously determining and recording the moldability index of granular material comprising an elongated hollow cylindrical member having imperforate end sections and a perforated central section, means mounting the elongated cylindrical member in a position inclined to the horizontal, means for feeding a continuous sample of the granular material into the upper end of the cylindrical member, means for rotating the cylindrical member to advance the sample of granular material to the lower end thereof, a trough positioned beneath the perforate portion of the cylindrical member, means for vibrating the trough to advance granular material received therein through the perforate section of the cylindrical member toward one end of the trough, a semi-circular shield secured to the trough extending for substantially one hundred eighty degrees about the cylindrical member, a torsion balance positioned beneath the trough and cylindrical member including a pair of balance planes, one of which is located to receive that portion of the sample of granular material passing entirely through the cylindrical member, the other of which is located to receive that portion of the sample of granular material passing over the one end of the trough, a light sensitive source of electric energy, a source of light directed toward the light sensitive source of electric energy, a light shield carried by the balance and positioned between the light sensitive source of electric energy and light source movable with the balance to regulate the amount of light falling on the light sensitive source of electric energy in accordance with the moldability of the sample of granular material as determined by the separation thereof between the cylindrical member and trough, an electric motor, a balanced electric circuit operable to drive the electric motor in a direction determined by the direction of change of the electric signal produced by the light sensitive source of electric energy connected to the light sensitive source of electric energy, a visual indicator connected to the motor for visually indicating the moldability index of the sample of granular material and permanent recording means including a pulley connected to and driven by the electric motor, a linear member driven by the pulley in opposite directions, a pen secured to the linear member, a chart engagable with the pen and means for continuously moving the chart in engagement with said pen.

2. A mill for mixing granular material, sample separating structure for separating a continuous sample of the granular material fed thereto from the mill into portions in accordance with the moldability of the sample of granular material including an inclined hollow cylindrical screen positioned to receive the continuous sample of granular material, supported at both ends by imperforate hollow cylindrical end sections, means for continuously rotating the cylindrical screen, a trough positioned beneath and extending longitudinally of the cylindrical screen to receive material discharged through the cylindrical screen on rotation thereof and means for vibrating the trough to advance granular material received therein longitudinally thereof, means for feeding a substantially constant sample of granular material from the mill to the separating structure, mechanism operably associated with the material separating structure for producing an electric signal representative of the moldability index of the continuous sample of granular material fed to the material separating structure as determined by the division of the sample of granular material by the material separating structure including a torsion band balance having a pair of balance planes, one of which is positioned to receive granular material passing entirely through the cylindrical screen longitudinally thereof and the other of which is positioned to receive granular material discharged by the trough, a light sensitive source of electrical energy, a source of light directed toward the light sensitive source of electric energy and a light shield positioned between the light sensitive source of electric energy and light source and carried by the balance for movement therewith and means responsive to the electrical signal for providing a continuous visual indication of the moldability index of the sample of granular material.

3. Structure as set forth in claim 2 wherein the torsion balance is provided with adjustable weight means to adjust the balanced position thereof.

4. Structure as set forth in claim 2 wherein the torsion balance is provided with piston and cylinder means for dampening the balancing movement thereof to prevent undue oscillation of the balance.

5. A mill for mixing granular material, sample separating structure for separating a continuous sample of the granular material fed thereto from the mill into portions in accordance with the moldability of the sample of granular material as determined by the formula $$\text{Moldability} = \frac{B}{A+B} \cdot 100$$

wherein B is the weight of the sample of granular material passing through a screen over which the granular material is passed and A is the weight of the sample of granular material retained on the screen over which the granular material is passed including a screen for receiving the continuous sample of granular material having openings therein of a size to permit the individual grains of the granular material to pass therethrough when not in cohesive masses and an elongated trough positioned beneath the screen for receiving the portion of granular material passing through the screen, means for feeding a substantially constant sample of granular material from the mill to the separating structure, mechanism operably associated with the material separating structure for producing an electric signal representative of the moldability index of the continuous sample of granular material fed to the material separating structure as determined by the division of the sample of granular material by the material separating structure and means responsive to the electric signal for providing a continuous visual indication of the moldability index of the sample of granular material.

6. A mill for mixing granular material, sample separating structure for separating a continuous sample of the granular material fed thereto from the mill into portions in accordance with the moldability of the sample of granular material including a screen for receiving the continuous sample of granular material and an elongated trough positioned beneath the screen for receiving the portion of granular material passing through the screen, means for feeding a substantially constant sample of granular material from the mill to the separating structure, mechanism operably associated with the material separating structure for producing an electric signal representative of the moldability index of the continuous sample of granular material fed to the material separating structure as determined by the division of the sample of granular material by the material separating structure comprising a torsion band balance having a pair of balance planes, one of which is positioned to receive granular material passing entirely over the screen and the other of which is positioned to receive granular material discharged by the trough, a light sensitive source of electric energy, a source of light directed toward the light sensitive source of electric energy and a light shield positioned between the light sensitive source of electric energy and light source and carried by the balance for movement therewith and means responsive to the electric signal for providing a continuous visual indication of the moldability index of the sample of granular material.

7. Structure as set forth in claim 6 wherein the torsion balance is provided with adjustable weight means to adjust the balance position thereof.

References Cited by the Examiner
UNITED STATES PATENTS

| | | | |
|---|---|---|---|
| 658,486 | 9/00 | Hayes | 259—164 |
| 2,113,928 | 4/38 | Behr | 346—32 X |
| 2,264,223 | 11/41 | Stancliffe | 209—237 |
| 2,782,926 | 2/57 | Saxe. | |
| 2,863,191 | 12/58 | Dietert et al. | 22—89 |
| 3,061,026 | 10/62 | Hecox et al. | 177—210 X |
| 3,143,777 | 8/64 | Dietert | 73—432 |

RICHARD C. QUEISSER, *Primary Examiner*.

DAVID SCHONBERG, *Examiner*.